United States Patent
Hu et al.

(10) Patent No.: US 12,250,035 B2
(45) Date of Patent: Mar. 11, 2025

(54) CODEBOOK FOR AI-ASSISTED CHANNEL ESTIMATION

(71) Applicant: Samsung Electronics Co., Ltd., Suwon-si (KR)

(72) Inventors: Yeqing Hu, Allen, TX (US); Xiaowen Tian, Raleigh, NC (US); Yang Li, Plano, TX (US); Tiexing Wang, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 18/365,874

(22) Filed: Aug. 4, 2023

(65) Prior Publication Data

US 2024/0056138 A1    Feb. 15, 2024

Related U.S. Application Data

(60) Provisional application No. 63/397,740, filed on Aug. 12, 2022.

(51) Int. Cl.
*H04B 7/0456* (2017.01)
*H04L 25/02* (2006.01)

(52) U.S. Cl.
CPC ....... *H04B 7/0456* (2013.01); *H04L 25/0204* (2013.01); *H04L 25/0256* (2013.01)

(58) Field of Classification Search
CPC .............. H04B 7/0456; H04L 25/0204; H04L 25/0256
See application file for complete search history.

(56) References Cited

U.S. PATENT DOCUMENTS

| | | |
|---|---|---|
| 9,124,322 B2 | 9/2015 | Yang et al. |
| 9,906,963 B2 | 2/2018 | Zhang et al. |

(Continued)

FOREIGN PATENT DOCUMENTS

| | | |
|---|---|---|
| CN | 103886859 B | 8/2016 |
| WO | 2008098221 A1 | 8/2008 |

OTHER PUBLICATIONS

Vilas Boas et al., "Artificial intelligence for channel estimation in multicarrier systems for B5G/6G communications: a survey", EURASIP Journal on Wireless Communications and Networking, vol. 2022, Article No. 116, Dec. 2022, 63 pages.

(Continued)

*Primary Examiner* — Janice N Tieu

(57) ABSTRACT

A method includes identifying ACF information by: obtaining channel information including multiple channels of expected operation scenarios; and based on the channel information for each of the channels, determining MMSE channel estimation (CE) weights expressed in a form of ACFs and an SNR, and covariance matrices. The method includes clustering the MMSE CE weights into K clusters. A center ACF weight of each of the K clusters represents a codeword. The method includes determining a distance metric based on a cluster distance after a re-clustering. The method includes, in response to a determination that cluster distances before and after the clustering differ from each other by a non-negligibly, iteratively re-clustering the ACF information thereby updating the center ACF weights and cluster distances. The method includes generating the codebook to include an index k of each of the K clusters and the center ACF weight of each of the K clusters.

20 Claims, 14 Drawing Sheets

(56) References Cited

U.S. PATENT DOCUMENTS

| | | | |
|---|---|---|---|
| 11,516,051 B2 | 11/2022 | Chandrasekhar et al. | |
| 2012/0060069 A1* | 3/2012 | Yu | H04B 7/0456 |
| | | | 714/752 |
| 2017/0373743 A1* | 12/2017 | Park | H04L 25/0224 |
| 2022/0369129 A1* | 11/2022 | Kim | H04W 16/28 |
| 2023/0388158 A1* | 11/2023 | Hu | H04L 25/0254 |

OTHER PUBLICATIONS

International Search Report and Written Opinion issued Nov. 13, 2023 regarding International Application No. PCT/KR2023/011918, 7 pages.

Jiang et al., "Deep Clustering-Based Codebook Design for Massive MIMO Systems", IEEE Access, vol. 7, Special Section on Artificial Intelligence for Physical-Layer Wireless Communications, Nov. 2019, pp. 172654-172664.

Hajri, "Performance improvement of 5G Wireless systems through adaptive grouping of users", Doctoral Thesis, Information and Communication Sciences and Technologies (ICST), University Paris-Saclay, Apr. 2018, 185 pages.

Akbar et al., "NOMA and 5G emerging technologies: A survey on issues and solution techniques", Computer Networks, vol. 190, 107950, Feb. 2021, 40 pages.

Han et al., "Joint Transmission Using Global Codeword and A Codebook Design for Coordinated Multipoint Processing (CoMP)", 2012 IEEE Globecom Workshops, Dec. 2012, pp. 1118-1122.

\* cited by examiner

| NLOS (~ DS [300, 1000] ns, delays<5000ns) | LOS (DS>20ns) | Sum |
|---|---|---|
| 699 (78.1%) | 196 (21.9%) | 895 |

| NLOS (~ DS [300, 1000] ns, delays<5000ns) | LOS (all CH) | Sum |
|---|---|---|
| 181 (31.75%) | 389 (68.25%) | 570 |

CODEBOOK FOR AI-ASSISTED CHANNEL ESTIMATION

CROSS-REFERENCE TO RELATED APPLICATION(S) AND CLAIM OF PRIORITY

This application claims priority under 35 U.S.C. § 119(e) to U.S. Provisional Patent Application No. 63/397,740 filed on Aug. 12, 2022. The above-identified provisional patent application is hereby incorporated by reference in its entirety.

TECHNICAL FIELD

This disclosure relates generally to wireless communication systems. More specifically, this disclosure relates to a codebook for AI-assisted channel estimation.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Channel estimation is a cornerstone of communication. Accurate channel estimation enables the high system throughput. Minimum mean square estimator (MMSE) channel estimation has some technical challenges.

SUMMARY

This disclosure provides codebook for AI-assisted channel estimation. In one embodiment, a method for generating a codebook for AI-assisted channel estimation is provided. The method is performed by at least one processor. The method includes identifying auto-correlation function (ACF) information by: obtaining channel information that includes multiple channels of expected operation scenarios; and based on the channel information for each of the channels, determining minimum mean-square error (MMSE) channel estimation (CE) weights expressed in a form of auto-correlation functions (ACFs) and a signal-to-noise ratio (SNR), and covariance matrices. The method includes clustering the MMSE CE weights from the ACF information into K clusters. A center ACF weight of each of the K clusters represents a codeword for computing channel estimation weights. The method includes determining a classification distance metric based on a cluster distance after a re-clustering. The method includes, in response to a determination that cluster distances before and after the clustering differ from each other by a non-negligible value, iteratively re-clustering the ACF information, thereby updating the center ACF weights and the cluster distances. The method includes generating the codebook to include an index k of each of the K clusters and the center ACF weight of each of the K clusters.

In another embodiment, an electronic device for generating a codebook for AI-assisted channel estimation is provided. The electronic device includes transceiver, and a processor coupled to the transceiver. The processor is configured to identify auto-correlation function (ACF) information. To identify the AFC information, the processor is further configured to obtain channel information that includes multiple channels of expected operation scenarios. Further to identify the AFC information, the processor is further configured to: based on the channel information for each of the channels, determine minimum mean-square error (MMSE) channel estimation (CE) weights expressed in a form of auto-correlation functions (ACFs) and a signal-to-noise ratio (SNR), and covariance matrices. The processor is configured to cluster the MMSE CE weights from the ACF information into K clusters. A center ACF weight of each of the K clusters represents a codeword for computing channel estimation weights. The processor is configured to determine a classification distance metric based on a cluster distance after a re-clustering. The processor is configured to, in response to a determination that cluster distances before and after the clustering differ from each other by a non-negligible value, iteratively re-cluster the ACF information thereby updating the center ACF weights and the cluster distances. The processor is configured to generate the codebook to include an index k of each of the K clusters and the center ACF weight of each of the K clusters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system.

As introduced above, minimum mean square estimator (MMSE) channel estimation has some technical challenges. One such challenge is that MMSE has large computation complexity and sometimes cannot be afforded, such as in cases where available computing resources are insufficient to handle execution of the large computation complexity. Another such challenge is that MMSE depends upon an estimate of second order statistics, such as in the form of covariance matrices. These second order statistics are challenging to obtain, especially in a case of low signal-to-noise (SNR) and high-mobility. Embodiments of this disclosure improve channel estimation by reducing computational complexity and providing algorithms with enhanced performance.

Figure 1:
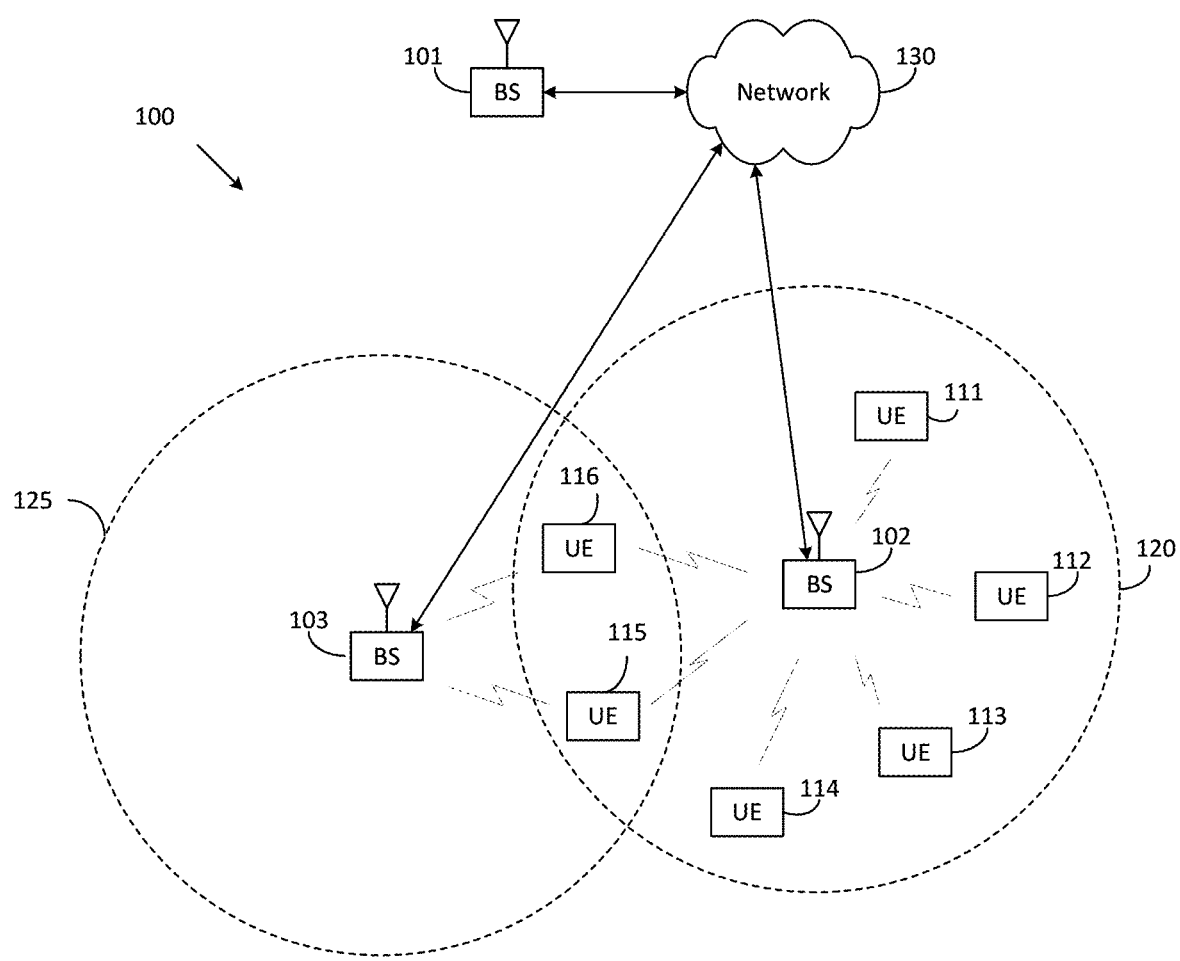
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

Figure 2:
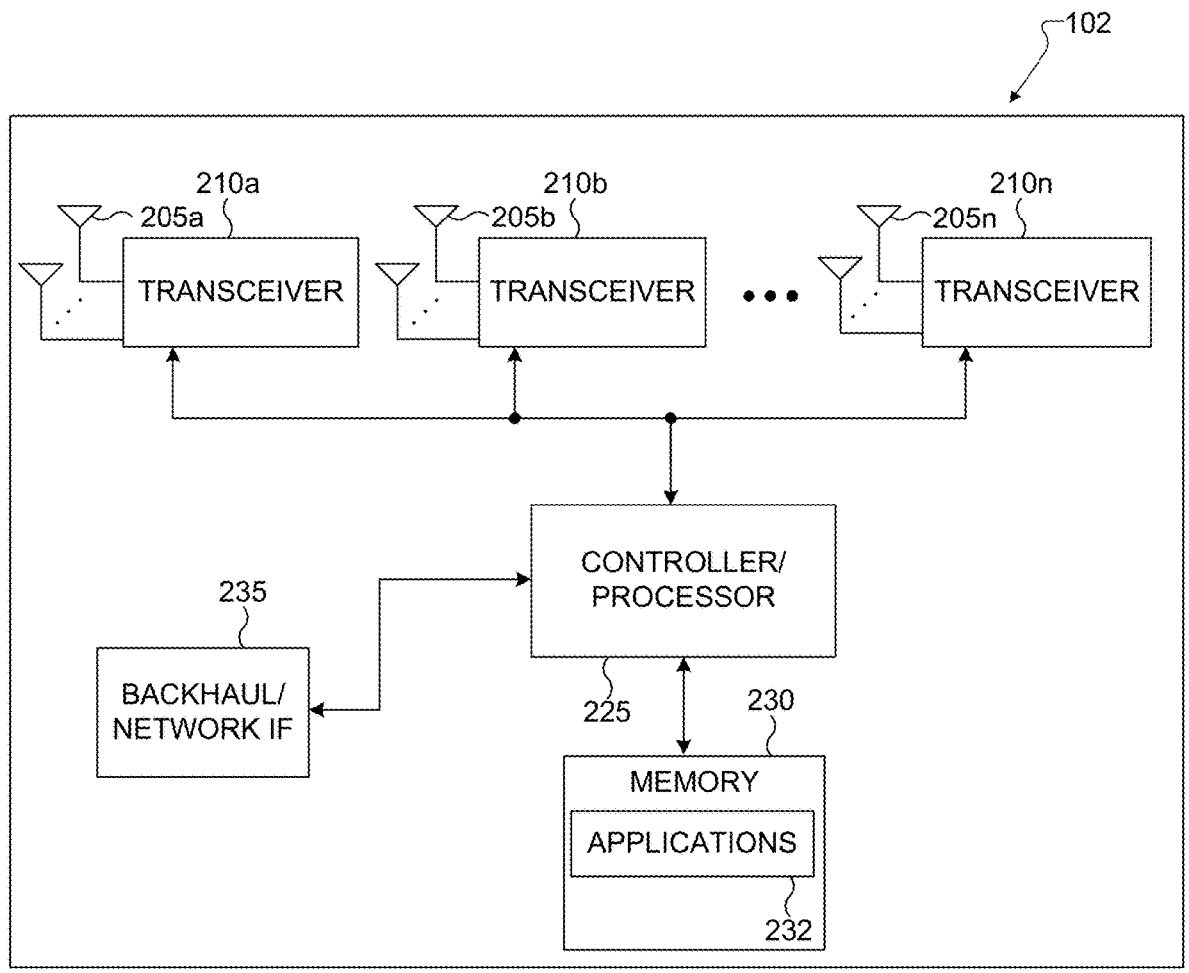
FIG. 2 illustrates an example gNodeB (gNB) according to this disclosure.
Figure 3:
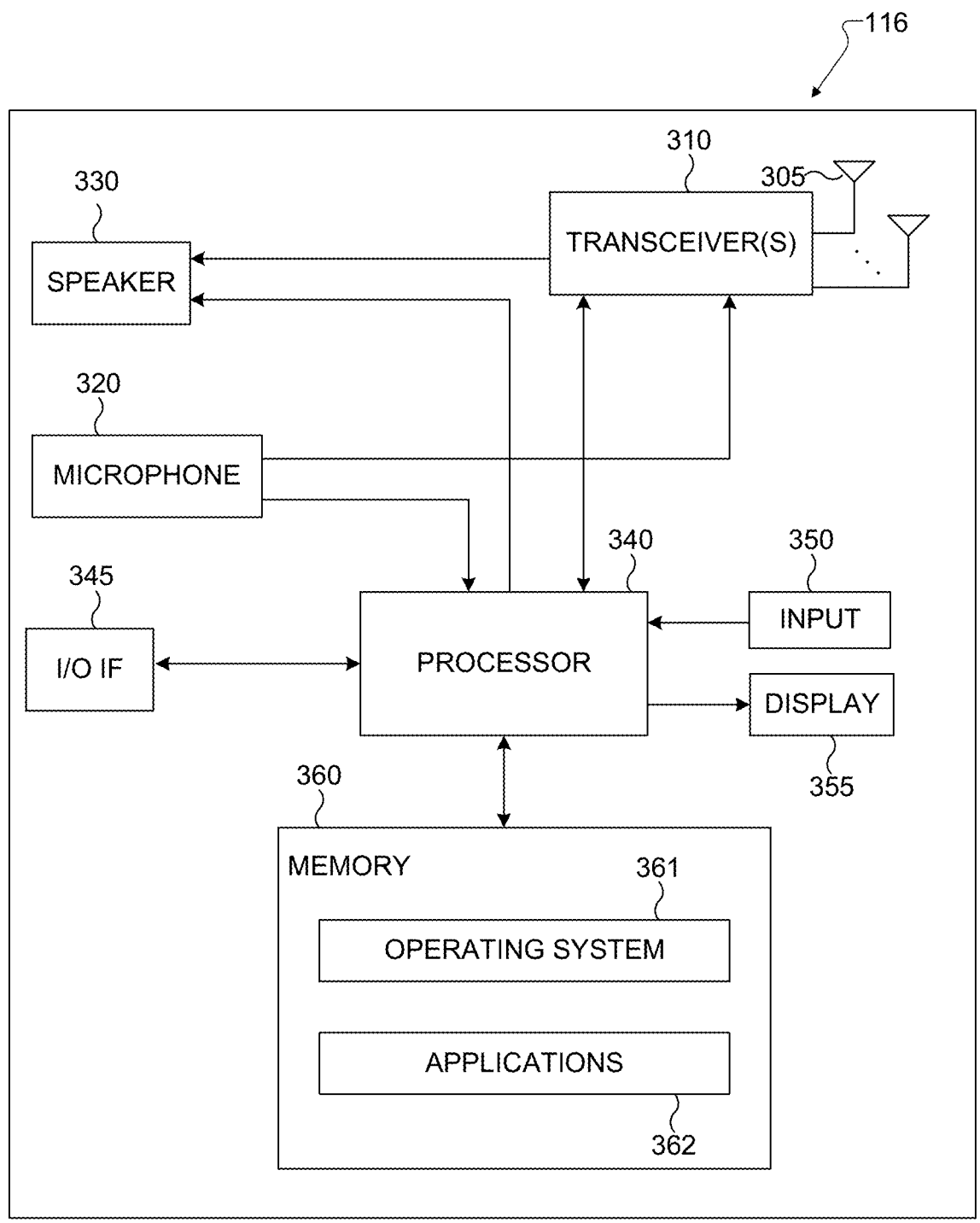
FIG. 3 illustrates an example user equipment (UE) according to this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, embodiments of this disclosure include systems and methods of generating, testing, and using a codebook for artificial intelligence assisted (AI-assisted) channel estimation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

As described in more detail below, embodiments of this disclosure include systems and methods of generating, testing, and using a codebook for AI-assisted channel estimation. To implements these methods, in certain embodiments, the memory 230 includes one or more applications 232. The controller/processor 225 is configured to execute the applications 232 based on the OS or in response to signals received from UEs or other network nodes.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming radio frequency (RF) signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

As described in more detail below, embodiments of this disclosure include systems and methods of generating, testing, and using a codebook for AI-assisted channel estimation.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
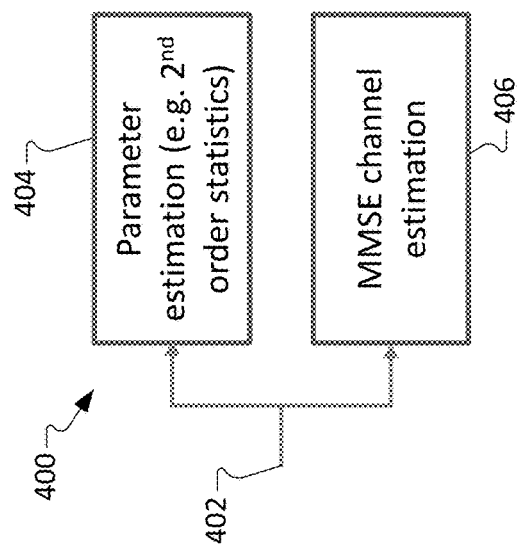
FIGS. 4A and 4B illustrate first and second methods of MMSE channel estimation, respectively.
Figure 4B:
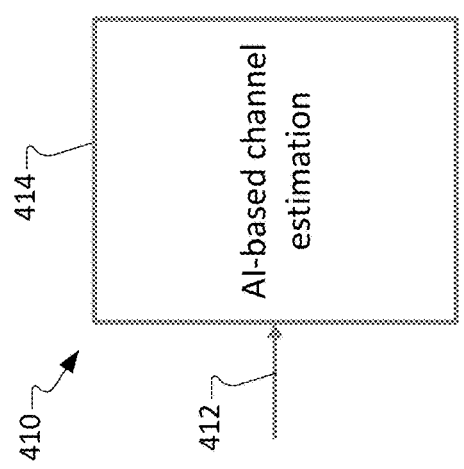
Figure 4C:
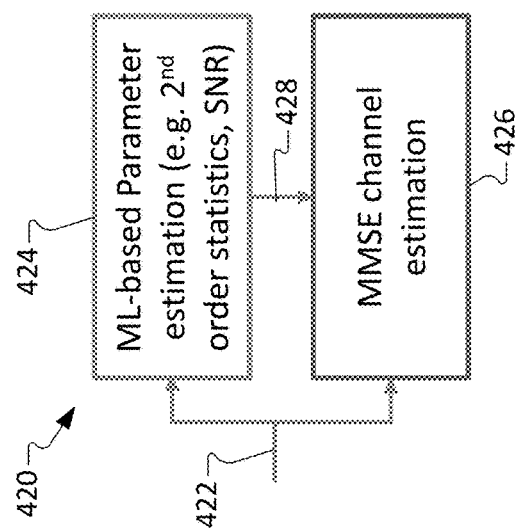
FIG. 4C illustrates the third MMSE channel estimation method, in accordance with embodiments of this disclosure.

FIGS. 4A, 4B, and 4C illustrate first, second, and third methods of MMSE channel estimation, respectively. Particularly, FIG. 4A illustrates the first MMSE channel estimation method 400 in which raw channel information 402 is input to both a parameter estimator 404 and an MMSE channel estimator 406. The parameter estimator 404 estimates parameters such as auto-correlation function (ACF) and signal noise (e.g., SNR). The MMSE channel estimator 406 constructs the MMSE channel estimation weight based on second order statistics.

FIG. 4B illustrates the second MMSE channel estimation method 410 in which raw channel information 412 is input to a blackbox type of AI-based channel estimation module 414, which outputs a final channel estimation value.

FIG. 4C illustrates the third MMSE channel estimation method 420, according to this disclosure. In the third MMSE channel estimation method 420, raw channel information 422 is received as input to both a machine learning based (ML-based) parameter estimator 424 and an MMSE channel estimator 426. The ML-based parameter estimator 424 estimates second order statistics 428 by utilizing AI. The second order statistics 428 include an ACF vector and noise power. The MMSE channel estimator 426 performs signal processing to determine the MMSE channel estimation based on the second order statistics 428 received. As a comparison, the MMSE channel estimator 426 performs the same or a similar function as the MMSE channel estimator 406 of FIG. 4A. As another comparison, the third MMSE channel estimation method 420 utilizes machine learning to augment the parameter estimation function, but the MMSE channel estimator 426 is not an AI module or ML-based estimator.

In NR, gNB channel estimation (CE) is critical for achieving high spectral efficiency and reliable cell coverage, as the estimated channel state information (CSI) is used for many operations.

In particular, for downlink (DL) data transmission, the gNB relies on the sounding reference signal (SRS) to estimate the CSI in a time division duplex (TDD) system, and uses the SRS to perform scheduling and beamforming weight calculation. For uplink (UL) data reception, the gNB obtains the CSI via demodulation reference signals (DMRS), and uses the CSI for equalization.

The CE typically comprises two stages of operation: (Stage 1) a noisy estimate is obtained by removing the reference signals (RS); and (Stage 2) the noisy estimate is refined before it can be used in subsequent modules or processing.

The refinement stage is critical, and utilizes carefully designed algorithms. In conventional signal processing, the MMSE estimator is optimal in the sense of the mean square error (MSE). The MMSE estimator exploits the second order channel statistics such as the covariance and cross-correlation matrices, and SNR (or noise power). However, these statistics are usually difficult to calculate, due to: the pilots (or RS) are transmitted sparsely in time and frequency domain; the RS can exhibit varying SNR due to power control and environment change; and the channel can experience non-stationarity especially in a mobility scenario. As a result, the MMSE is computationally expensive to deploy in commercial systems.

A communication system that implements generic machine learning (ML) methods resorts to utilizing neural networks (NN) to directly learn how to refine the noisy estimate. An example generic ML method splits the noisy channel estimate into real and imaginary parts, feed into an NN, and use MSE as the cost function. These generic ML methods do not utilize the signal structure or prior knowledge for channel estimation, and underperforms the MMSE. In addition, due to the computation complexity, the communication system that implements generic ML methods suffers from larger processing latency.

The embodiments according to this disclosure provide a novel codebook design for AI-assisted channel estimation. In particular, the design of the codebook is for ACF by clustering the ideal channel estimation weights aiming to minimize the channel estimation loss.

Figure 5:
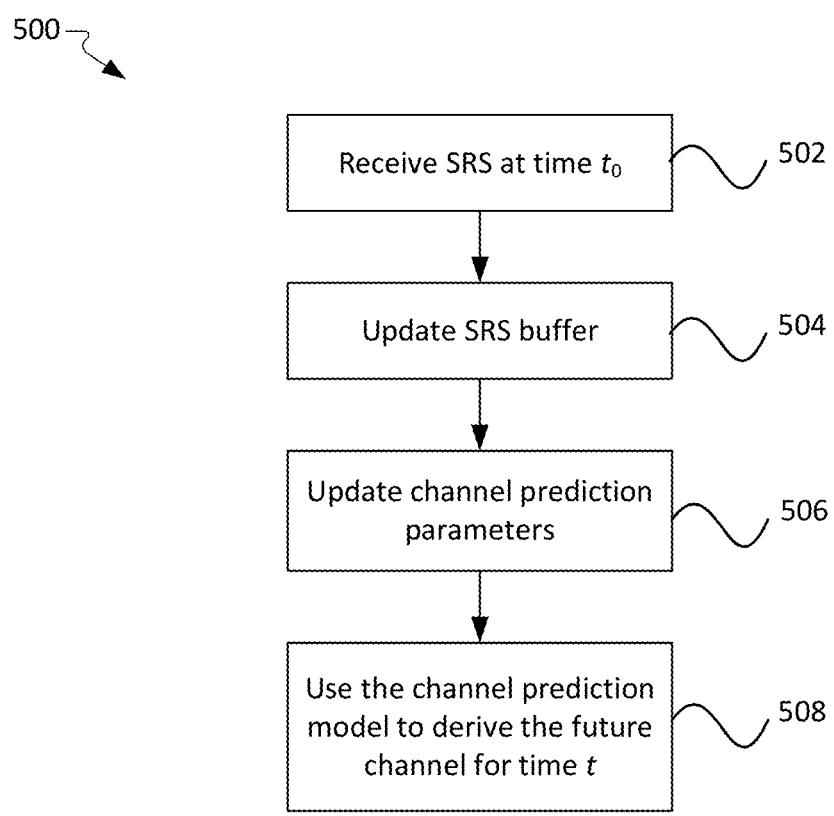
FIG. 5 illustrates a method of channel estimation from the gNB side, according to this disclosure.

FIG. 5 illustrates a method 500 of channel estimation from the gNB side, according to this disclosure. The method of FIG. 5 may be performed by any appropriate device, such as a gNB (e.g., gNB 102 of FIGS. 1 and 2), that includes a processor (e.g., processor 225) configured to implement a channel estimation algorithm.

At block 502, the gNB 102 receives the sounding reference signal (SRS) at time $t_0$. This disclosure provides additional details about the procedure performed at block 502. At block 504, the gNB 102 updates the SRS buffer. At block 506, the gNB 102 updates channel prediction parameters. At block 508, the gNB 102 uses a channel prediction model to derive the future channel for time t.

Figure 6:
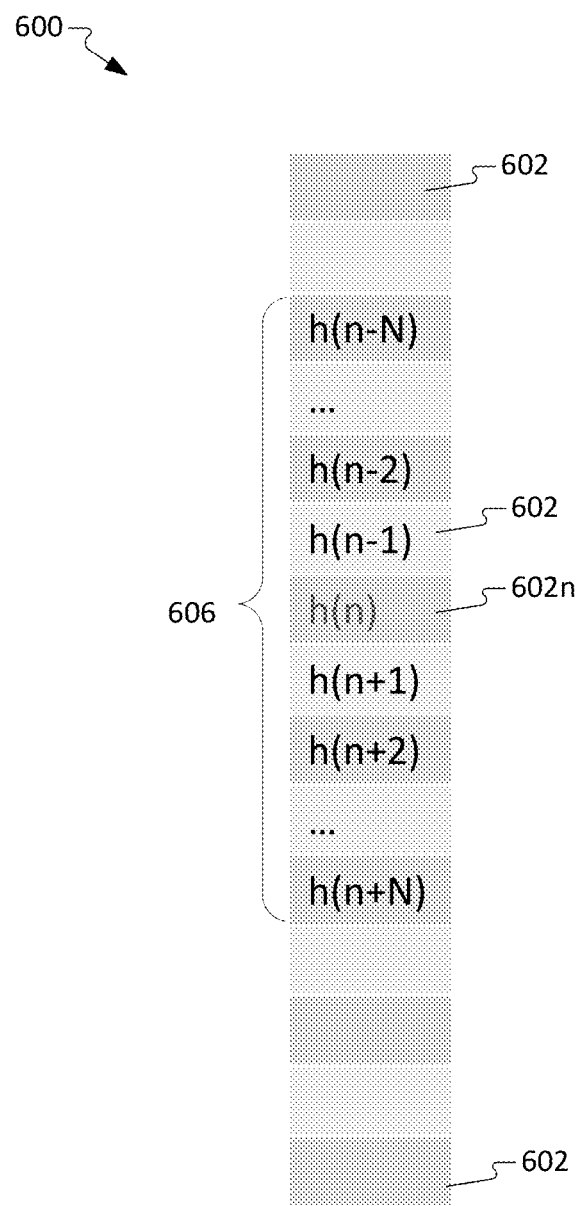
FIG. 6 illustrates a channel vector that includes a plurality of M elements, according to this disclosure.

FIG. 6 illustrates a channel vector 600 that includes a plurality of M elements 602, according to this disclosure. Each element 602 represents a frequency point.

For the first time of a channel estimation, the channel vector usually exhibits a very noisy channel. To determine the channel estimation for a particular frequency point (represented by a particular element 602n), an analysis is performed on raw channel information received via a neighborhood 606 of the particular frequency point, and the analysis includes applying a filtering weight to each element within the neighborhood 606. The neighborhood 606 is a subset of the M elements 602 of the channel vector 600. The neighborhood 606 includes the particular element 602n (labeled h(n)) and some other elements surrounding the particular element 602n. The quantity of other elements surrounding the particular element 602n can vary in various embodiments of this disclosure. As an example, neighborhood 606 includes the particular element 602n in the middle, a number N of elements preceding the particular element 602n (labeled h(n−1) through h(n−N)), and N elements following the particular element 602n (labeled h(n+1) through h(n−N)), which is a total of 2N+1 elements 602. All the elements 602 within the neighborhood 606 are used to obtain a refined estimation of the middle element 602n.

Below, this disclosure further the channel vector 600 aids in a description of the signal model, channel model and ACF, interpretation of MMSE weights in the delay domain, and problem formulation.

After removing RS, the observation $\tilde{h}$ can be expressed by the ground-truth channel h and noise σ, as shown in Equation 1:

$$\tilde{h} = h + \sigma \qquad (1)$$

In the case of OFDM systems, assume that the channels for neighbor subcarriers are highly correlated, and use a portion of the noisy channel for the refinement step, which can be expressed according to Equation 2.

$$\tilde{h} \in \mathcal{C}^{L \times 1} \qquad (2)$$

An estimation weight w is used to refine the noisy estimate $\tilde{h}$ and further estimate the channel for the n-th subcarrier $\hat{h}(n)$, as shown in Equation 3.

$$\hat{h}(n) = w\tilde{h} \qquad (3)$$

In the case of modem realization (also referred to as modem baseline), moving average (MA) is used to determine the estimation weight w, as expressed in Equation 4. The term L denotes feature length (e.g., length of weights) and depends on the estimated SNR.

$$w = \frac{1}{2L+1}[1, 1, 1, \ldots 1] \qquad (4)$$

However, embodiments of this disclosure are based on an assumption of independent Gaussian noise, and the MMSE is used as the optimal estimator of the estimation weight w, as shown in Equation 5. The term $r_{h\tilde{h}}$ denotes the covariance of the ground truth channel and the noisy estimate channel. The term $$R_{\tilde{h}\tilde{h}}^{-1}$$

denotes the inverse of the auto-covariance of the noisy estimate channel. The term $e_d$ is a one-hot vector. The term $e_d$ denotes a selection vector whose elements are zeros except that the center element is 1. The term $e_d^T$ denotes the transpose of the selection vector $e_d$. The term $R_{hh}$ denotes the auto-covariance of the ground truth channel, but $R_{hh}$ is usually difficult to compute online. The term I denotes an identity matrix.

$$w = r_{h\tilde{h}}R_{\tilde{h}\tilde{h}}^{-1} = e_d^T R_{hh}(R_{hh} + \sigma^2 I)^{-1} \qquad (5)$$

The channel for the n-th subcarrier is modelled as set forth in Equation 6. The term h denotes the channel. The term $\gamma_p$ denotes the complex gain, $\tau_p$ denotes the delay for path p, and Δf denotes the subcarrier distance. In relation to $\gamma_{p,t}$ and $h_t(n)$, subscript t denotes the t-th transmission time interval.

$$h_t(n) = \Sigma_p \gamma_{p,t} e^{-j2\pi n \Delta f \tau_p} \qquad (6)$$

The ACF can be expressed as shown in Equation 7. The term r(k) denotes the ACF for frequency delay k (e.g., lag) for the purpose of determining and/or transforming to MMSE weight.

$$r(k) = \mathbb{E}_{n,t}[h_t(n)h^*_t(n-k)] \qquad (7)$$

Based on an assumption that all paths are independent, the ACF with channel parameters can be expressed as shown in Equation 8.

$$r(k) = \Sigma_p |\gamma_p|^2 e^{-j2\pi k \Delta f \tau_p} \qquad (8)$$

The second-order statistics can be expressed as shown in Equation 9. In other words, MMSE weights can be obtained by constructing the second-order statistics using the ACF that is obtained from channel parameters.

$$R_{\tilde{h}\tilde{h}} = E\left\{\begin{bmatrix}\tilde{h}(n-N)\\ \vdots \\ \tilde{h}(n-1) \\ \tilde{h}(n) \\ \vdots \\ \tilde{h}(n+N)\end{bmatrix}\begin{bmatrix}\tilde{h}(n-N)\\ \vdots \\ \tilde{h}(n-1) \\ \tilde{h}(n) \\ \vdots \\ \tilde{h}(n+N)\end{bmatrix}^H\right\} = \\ \begin{bmatrix}r(0), \ldots, r(-N+2), r(-N+1),\\ r(-N), r(-N-1), r(-N-2), \ldots, r(-2N)\\ \ldots\\ r(-1+N), \ldots, r(1), r(0), r(-1), r(-2), r(-3), \ldots, r(-1-N)\\ r(N), \ldots, r(2), r(1), r(0), r(-1), r(-2), \ldots, r(-N)\\ \ldots\\ r(2N), \ldots, r(N+2), r(N+1), r(N), r(N-1), r(N-2), \ldots, r(0)\end{bmatrix} + \sigma^2 I \qquad (9)$$

As an interpretation of MMSE weights in delay domain, the channel impulse response g(τ) is expressed as shown in Equation 10. The term $\lambda_p$ denotes the channel coefficient in the delay domain, Δτ denotes the delay resolution, τ denotes delay, p denotes the path, δ denotes the Dirac delta function.

$$g(\tau) = \Sigma_p \lambda_p \delta(\tau - p\Delta\tau) \qquad (10)$$

Based on an assumption that delay taps are integers to avoid leakage introduced by fast Fourier transform (FFT), the channel in frequency domain can be expressed as shown in Equation 11. The term F denotes the discrete Fourier transform (DFT) matrix.

$$\mathcal{F}\{g\} = h = Fg \qquad (11)$$

The MMSE weights in delay domain is expressed as shown in Equation 12. The term $R_{gg}$ denotes diagonal and represents the channel power delay profile. The term $F^H$ denotes the Hermitian transpose of the DFT matrix F.

$$\begin{aligned}\mathcal{F}\{w\} &= e_d^T R_{hh}(R_{hh} + \sigma^2 I)^{-1} F \\ &= e_d^T F R_{gg} F^H (F R_{gg} F^H + \sigma^2 I)^{-1} F \\ &= e_d^T F R_{gg} F^H F(R_{gg} + \sigma^2 I)^{-1} F^H F \\ &= e_d^T F R_{gg}(R_{gg} + \sigma^2 I)^{-1}\end{aligned} \qquad (12)$$

To try to match the channel power delay profile (PDP) in the delay domain, the amplitude of MMSE weights in the delay domain is expressed as shown in Equation 13, accounting for noise level.

$$|\mathcal{F}\{w\}| = \left[0, \ldots, 0, \ldots, \frac{\lambda_1^2}{\lambda_1^2 + \sigma^2}, \ldots, 0, \ldots, 0, \frac{\lambda_k^2}{\lambda_k^2 + \sigma^2}, 0, \ldots, 0\right] \quad (13)$$

Although FIG. 6 illustrates an example of a channel vector 600, various changes may be made to FIG. 6. For example, various components in FIG. 6 could be combined, further subdivided, or omitted and additional components could be added according to particular needs. As a particular example, the neighborhood 606 can be truncated to remove some of the surrounding elements that surround the middle element 602n, such that the truncated neighborhood includes fewer elements 602 than the original neighborhood 606.

Figure 7:
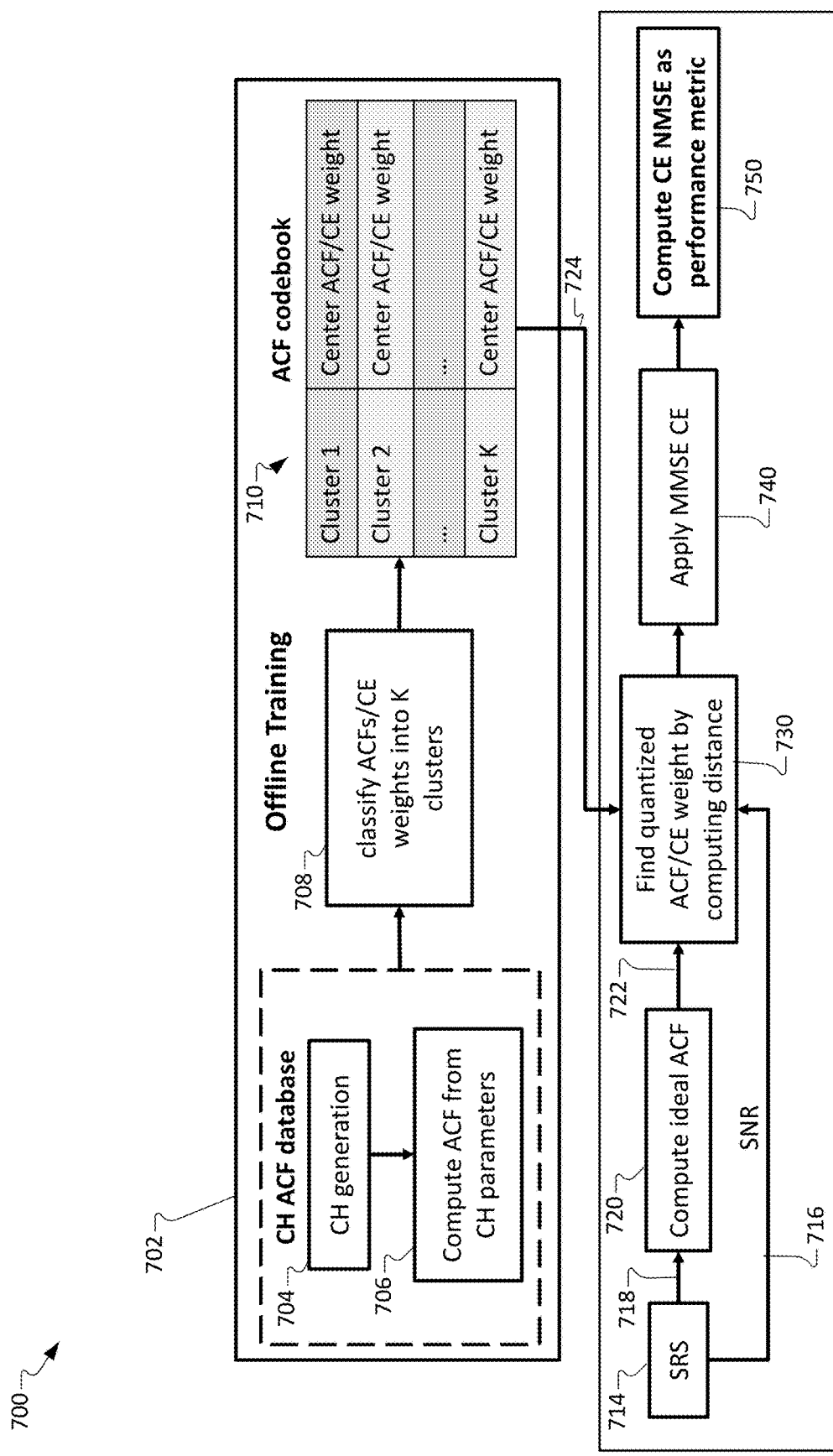
FIG. 7 illustrates a block diagram of a system for generating and testing a codebook for artificial intelligence assisted (AI-assisted) channel estimation, according to this disclosure.

FIG. 7 illustrates a block diagram of a system 700 for generating and testing a codebook for AI-assisted channel estimation, according to this disclosure. The embodiment of the system 700 shown in FIG. 7 is for illustration only, and other embodiments could be used without departing from the scope of this disclosure.

The system 700 implements a data-based clustering method to obtain a channel estimation codebook. The system 700 includes a subsystem of offline training 702, which uses a data-based clustering method (e.g., K-medoids) with mismatched weigh error performance as the distance function. Offline can mean not in real-time, not online. The subsystem of offline training 702 includes a channel generator 704 and an ACF generator 706 (collectively "CH ACF database"), a classifier 708, and an ACF codebook 710. As a particular example of the CH ACF database, the ACF generator 706 includes the system parameters that are the 3GPP system parameters, and the channels are generated by the channel generator 704 according to 3GPP UMi outdoor UE dropping. Each drop contains 570 UEs, and the UE speed is set as 6 kilometers per hour (kmph). The generated channels are mixed with line-of-sight (LOS) channels and non-line-of-sight (NLOS) channels. The generated channels are biased because it is not sufficient in NLOS channels with larger delay spread. Additional details of cleaning the dataset of the CH ACF database is described further below with reference to FIG. 9.

The system 700 also includes testing subsystem 712 that implements a testing procedure, which is to first compute the ideal ACF of a testing sample, then to identify a proper codeword that minimizes the distance metric, and to use the proper codeword to construct MMSE weight and compute channel estimation. The testing subsystem 712 receives an SRS 714 as input, and obtains a SNR 716 and CSI 718 based on the SRS received. The testing subsystem 712 includes an ACF computation module 720 that computes the ideal ACF 722 of a testing sample. The testing subsystem 712 includes a distance metric computation module 730 that minimizes the distance metric to identify a proper codeword, based on the ideal ACF 722 and information 724 identified from the codebook 710. The testing subsystem 712 includes an MMSE channel estimator 740, which can be the same as or similar to the MMSE channel estimator 426 of FIG. 4C. The testing subsystem 712 includes a performance meter 750 that computes an NMSE channel estimation as a performance metric.

The system 700 demonstrates the effectiveness of the mismatched weight error performance as clustering distance metric, then computes channel estimation using the codebook 710 on a testing dataset. Further, system 700 is configured to apply the codebook 710 for lower SNR and shorter feature length scenarios, compared to the higher SNR and longer feature lengths that the offline training 702 used as a basis to construct the codebook 710.

For evaluating the performance of channel estimation, the performance meter 750 uses normalized MSE (NMSE) as the performance metric, as shown in Equation 14.

$$NMSE = \frac{\|\hat{h} - h\|^2}{\|h\|^2} \quad (14)$$

To connect the channel estimation performance and the distance metric when clustering, the system 700 utilizes the mismatched weight error performance as the clustering distance metric.

The MSE of estimating ground truth channel h using an arbitrary weight w is expressed as shown in Equation 15.

$$MSE(w) = w(R_{hh} + \sigma^2 I)w^H - wR_{hh}e_d - e_d^T R_{hh}w^H + \mathbb{E}\{|h(n)|^2\} \quad (15)$$

The mismatched weight is denoted as shown in Equation 16, where $w_c$ denotes the codeword weight, and $w_a$ denotes the ideal weight of sample a, and $R_{hha}$ is constructed using the ideal ACF of sample a. The ideal weight $w_a$ of sample a can be expressed as shown in Equation 17.

$$\Delta w_a \triangleq w_c - w_a \quad (16)$$

$$w_a = e_d^T R_{hha}(R_{hha} + \sigma^2 I)^{-1} \quad (17)$$

Based on an assumption that $\mathbb{E}\{|h(n)|^2\} = R_{hha}(1,1)$, the system 700 uses normalized mismatched weight error performance as the distance metric for clustering, as shown in Equation 18.

$$J(\Delta w_a) = NMSE(\Delta w_a) = \frac{\Delta w_a(R_{hha} + \sigma^2 I)\Delta w_a^H}{R_{hha}(1,1)} \quad (18)$$

K-means is an unsupervised learning method that minimizes the sum-distance of all clusters. However, the K-means method updates the centroids by averaging all the samples within that cluster. In accordance with embodiments of this disclosure, the distance metric is unsymmetrical, and the newly-updated centroids might not have the minimum sum-distance. Therefore, convergence is not guaranteed.

The K-medoids method, however, updates the centers of each cluster by selecting the sample that has the minimized sum-distance to all other samples in the cluster. In certain embodiments, no new samples can be generated in this procedure, and therefore convergence is guaranteed.

Although FIG. 7 illustrates an example of a system 700 for generating and testing a codebook for AI-assisted channel estimation, various changes may be made to FIG. 7. For example, various components in FIG. 7 could be combined, further subdivided, or omitted and additional components could be added according to particular needs.

Figure 8:
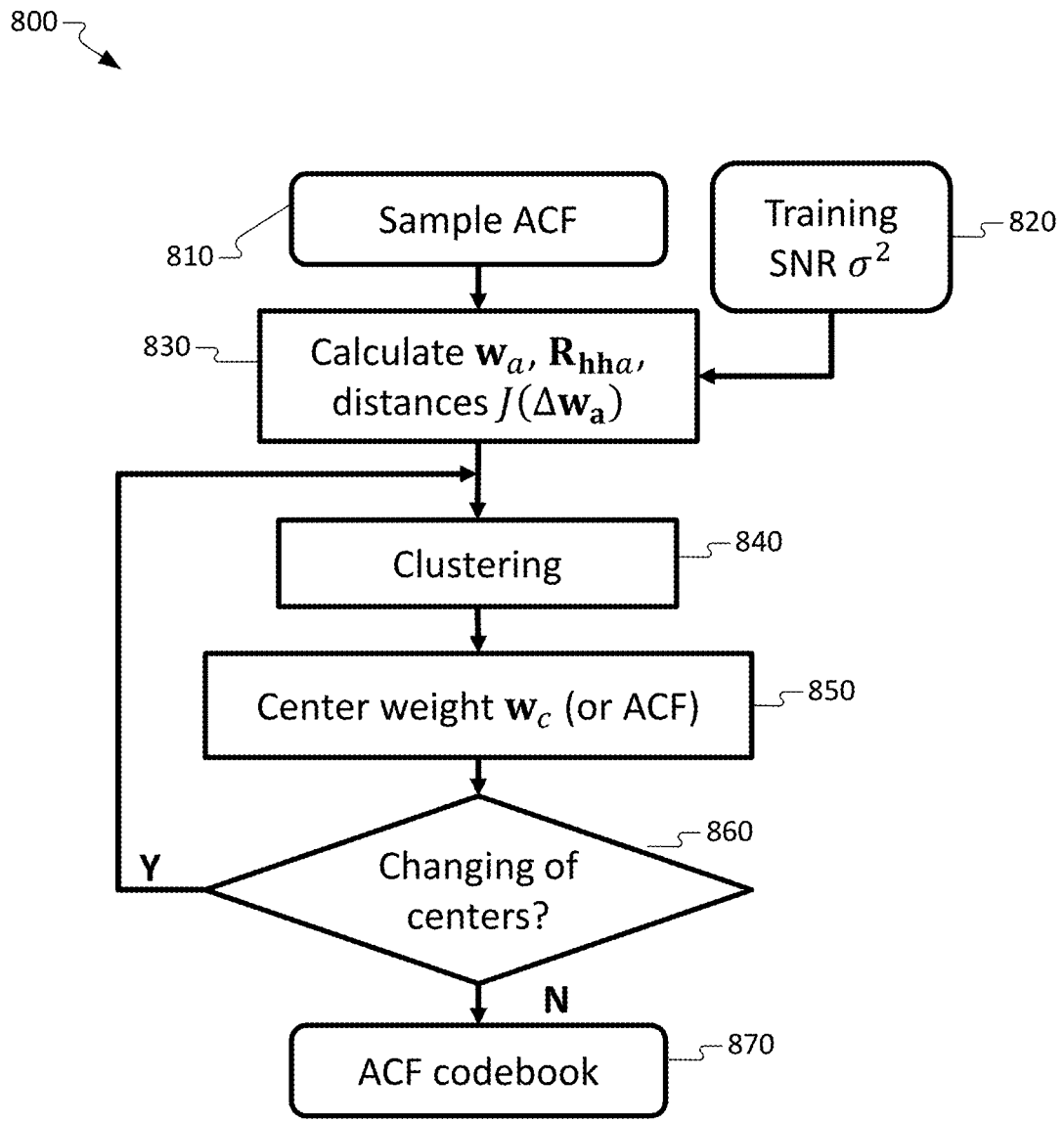
FIG. 8 illustrates a clustering method, according to this disclosure.

FIG. 8 illustrates a clustering method 800, according to this disclosure. The method 800 is implemented by the system 700, for example by the classifier 708.

At block 810, a sample ACF is obtained. At block 820, a training SNR ($\sigma^2$) is obtained. At block 830, the system 700 calculates the $w_a$, the $R_{hha}$, and the distances $J(\Delta w_a)$. The $w_a$ denotes the ideal weight of sample a. The $R_{hha}$ denotes ideal covariance matrices of sample a. The distances $J(\Delta w_a)$ denotes the distances between all samples. At block 840, the system 700 performs clustering by applying a clustering algorithm, thereby generating a number of clusters (i.e., K clusters). In some embodiments, the clustering algorithm is a K-medoids function. In another embodiment, the clustering algorithm is a K-mean function.

At block 850, the system 700 determines a cluster center for each of the K clusters. For example, the cluster center is a center weight $w_c$, according to embodiments of this disclosure. More particularly, special handling is utilized to determine a cluster center, which can be computed as shown in Equations 19-20, where $w_a$ represents ideal MMSE weights for sample a, $w_c$ represents the center weight, and $R_{hha}$ represents a covariance matrix of sample channel a. Each of the $w_a$ and $w_c$ weights is associated with an ACF weight.

$$w_c = \min_{w_c}\left(\sum (w_a - w_c)^H R_{hha}(w_a - w_c)\right) \quad (19)$$

$$w_c = \left(\sum R_{hha} w_a\right) / \sum R_{hha} \quad (20)$$

At block 860, the system 700 determines whether to change the cluster centers by re-clustering. In response to a determination to change the cluster centers, method 800 returns to block 840 where the system 700 performs re-clustering. In response to a determination to not change the cluster centers, method 800 proceeds to block 870. At block 870, the system 700 generates a codebook (such as the ACF codebook 710 of FIG. 7) to include an index k of each of the K clusters and the center ACF weight of each of the K clusters.

In one embodiment of the method 800, the input of K-medoids function is the ideal ACFs of all training samples. For example, the sample ACF is obtained at block 810 can include a plurality of training samples, such as a set that contains all of the training samples. At block 830, based on the training SNR obtained at block 820, the system 700 calculates the ideal weights, ideal covariance matrices, and the distances between all samples. Then, at block 840, the system 700 applies a k-medoids clustering method and iterates updating the cluster centers until the cluster centers cease change or iterations of re-clustering has reached a limit (e.g., maximum iteration). At block 860, the output codebook is composed of the cluster centers' ACFs.

In another embodiment of the method 800, the clustering method utilized is K-mean. When updating the cluster center, the K-mean selects the 'average' of all samples to be the cluster center, unlike the K-medoids method that selects one sample of the cluster as the center. There are two challenges to resolve in this k-mean scenario: (1) the clustering is performed in the MMSE weight domain; and (2) the mathematical 'average' of the MMSE weight does not have physical representative meaning. In order to resolve the above two challenges, embodiments of this disclosure are configured to: perform clustering of the MMSE weight in the very high-SNR region, and then convert the MMSE weight back to ACF domain from the MMSE weight domain, so that the final codebook (i.e., output at block 870) is still in the ACF domain.

Although FIG. 8 illustrates an example of a clustering method 800, various changes may be made to FIG. 8. For example, at block 870 as an alternative of the codebook design, when classifying the channels, the channel delay profile (e.g., power delay profile) can be scaled into unit/equal length, and the system 700 can perform the classification based on scaled channel profiles. After the scaling, the classification is essentially performed to classify the 'shape' of the channel delay profile. When applying the classification results, prior knowledge of the channel delay can be applied to scale the channel, or scale the classified ACF.

Figures 9, 10, 11:
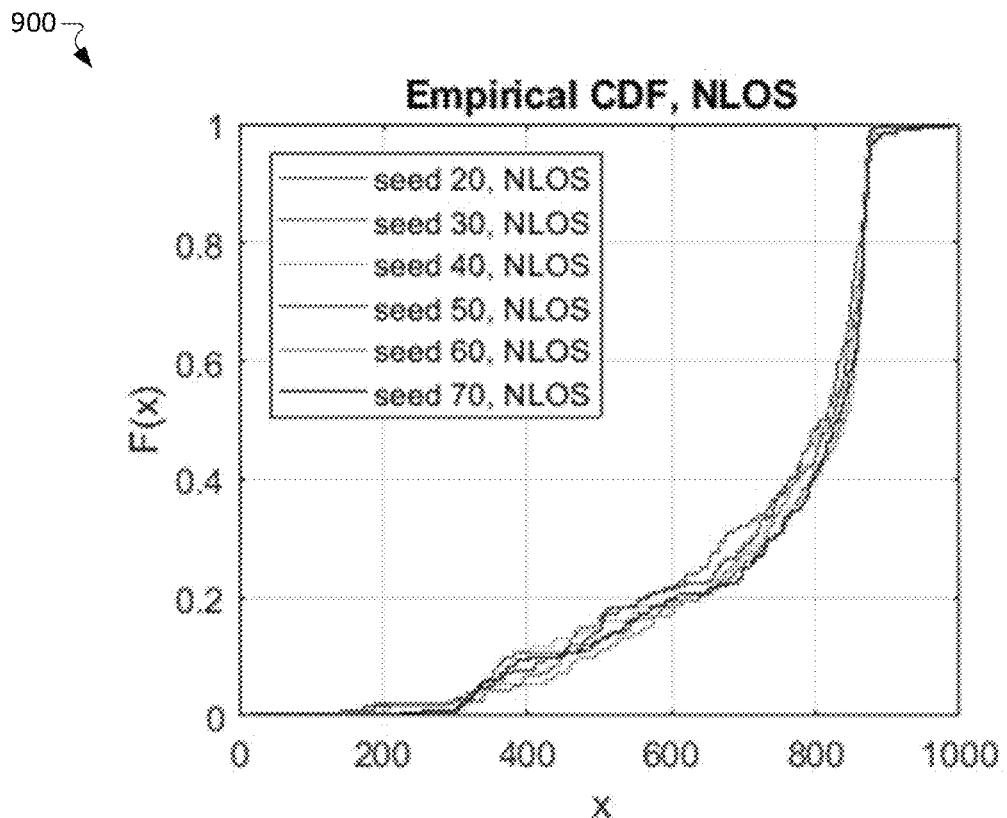
FIG. 9 illustrates a graph of empirical cumulative density function (CDF) for all NLOS channels after scaling the dataset for each seed, according to this disclosure.
FIG. 10 is a table describing the training dataset from seeds 20, 30, 60, and 70, according to this disclosure.
FIG. 11 is a table describing a testing dataset of seed 40, according to this disclosure.

FIGS. 9-11 illustrate a training and testing dataset, according to this disclosure. FIG. 9 illustrates a graph 900 of empirical cumulative density function (CDF) for all NLOS channels after scaling the dataset for each seed, according to this disclosure. The dataset represented in FIG. 9 is from seed 20, 30, 40, 50, 60, and 70.

To clean the dataset of the CH ACF database (704-706) of FIG. 7), the graph 900 of FIG. 9 shows that for NLOS channels, the delay spread in [300, 1000] nanoseconds (ns) is randomly selected as the target delay spread. Then, the delays are scaled to meet this target delay spread (e.g., delay spread requirement). For LOS channels, if a delay spread is less than 20 ns, then the system 700 deletes the sub-20 ns delay spread from the dataset. Then, according to extended typical urban model (ETU), the system 700 truncates the delays at 5000 ns.

FIG. 10 is a table describing the training dataset from seeds 20, 30, 60, and 70, according to this disclosure. FIG. 11 is a table describing a testing dataset of seed 40, according to this disclosure. The NLOS channels from seeds 20, 30, and 60 are used along with mixed LOS and NLOS channels from seed 70 as the training dataset, as shown in the graph 900 of FIG. 9 and the tables of FIGS. 10-11.

Figure 13:
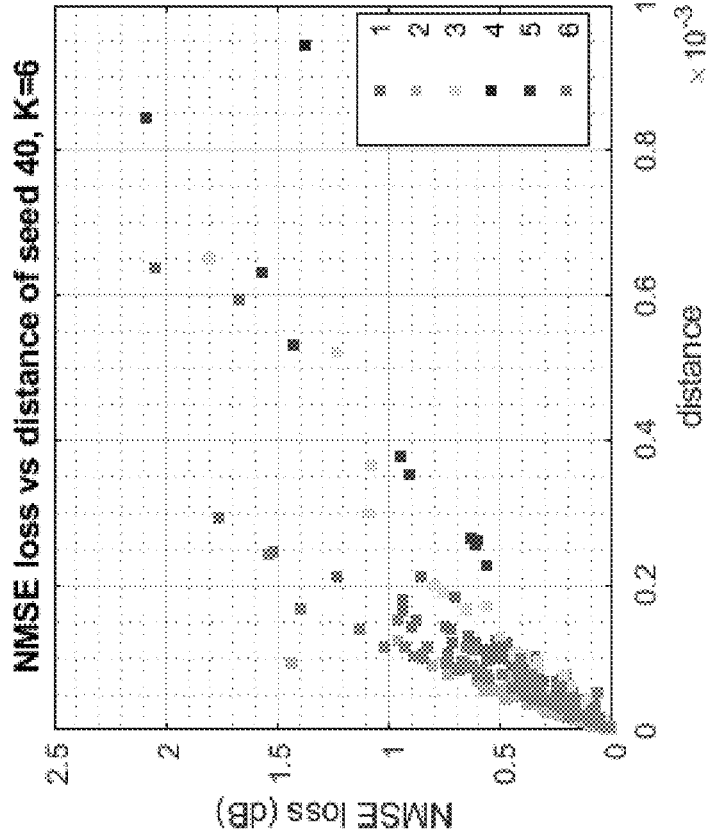
FIGS. 12 and 13 illustrate simulation results, according to this disclosure.
Figure 12:
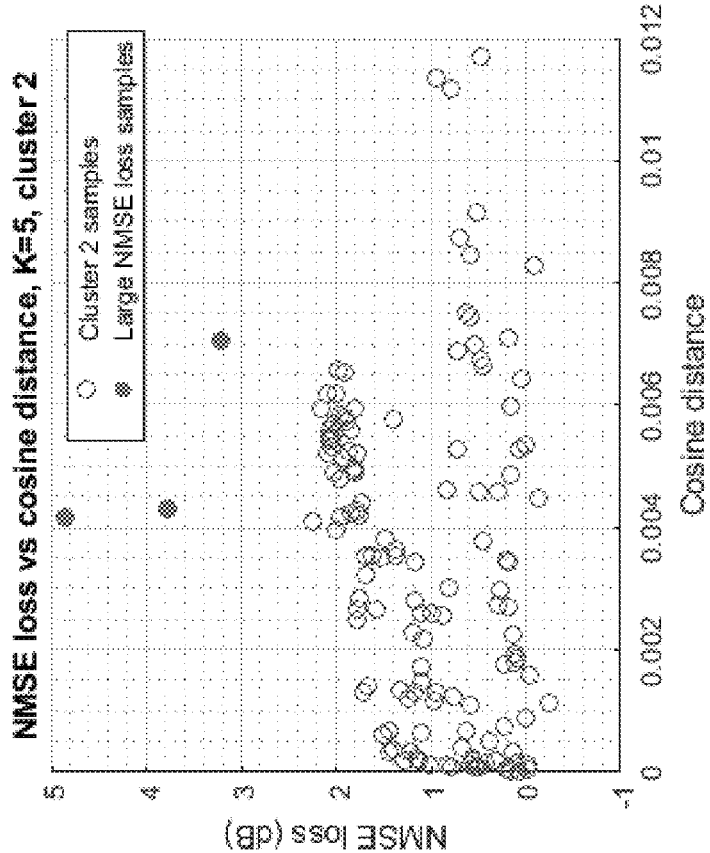

FIGS. 12-13 illustrate simulation results, according to embodiments of this disclosure. FIG. 12 illustrates a graph of NMSE loss versus cosine distance in a case of cluster 2 (index k=2) among a set of 5 clusters (K=5 total). The number of clusters also represents the number of codewords in the codebook (K=5). The range of the y-axis is from −1 to 5 decibels (dB), and the domain of the x-axis is from 0 to 0.012. The legend explains that shaded dots represent the large NMSE loss samples, and hollow dots represent Cluster 2 samples. The illustration of cosine similarity of ACF, as shown in FIG. 12, does not imply the performance error.

FIG. 13 illustrates a graph of NMSE loss versus distance of seed 40 in a set of 6 clusters (K=6 total), according to embodiments of this disclosure. The range of the y-axis is from 0 to 2.5 dB, and the domain of the x-axis is from 0 to $1.0 \times 10^{-3}$. The legend visually distinguishes (e.g., different colors or different hashing) samples for each respective cluster index k from 1 through 6. The new distance metric (i.e., distance of seed) has a linear relationship to the estimation performance.

The graph of FIG. 13 enables an evaluation that the mismatched weights error performance can indicate channel estimation performance. Specifically, the NMSE loss in dB is obtained by comparing the NMSE using the ideal MMSE weight. As is shown in FIG. 13, a smaller distance indicates a better estimation.

Figure 14:
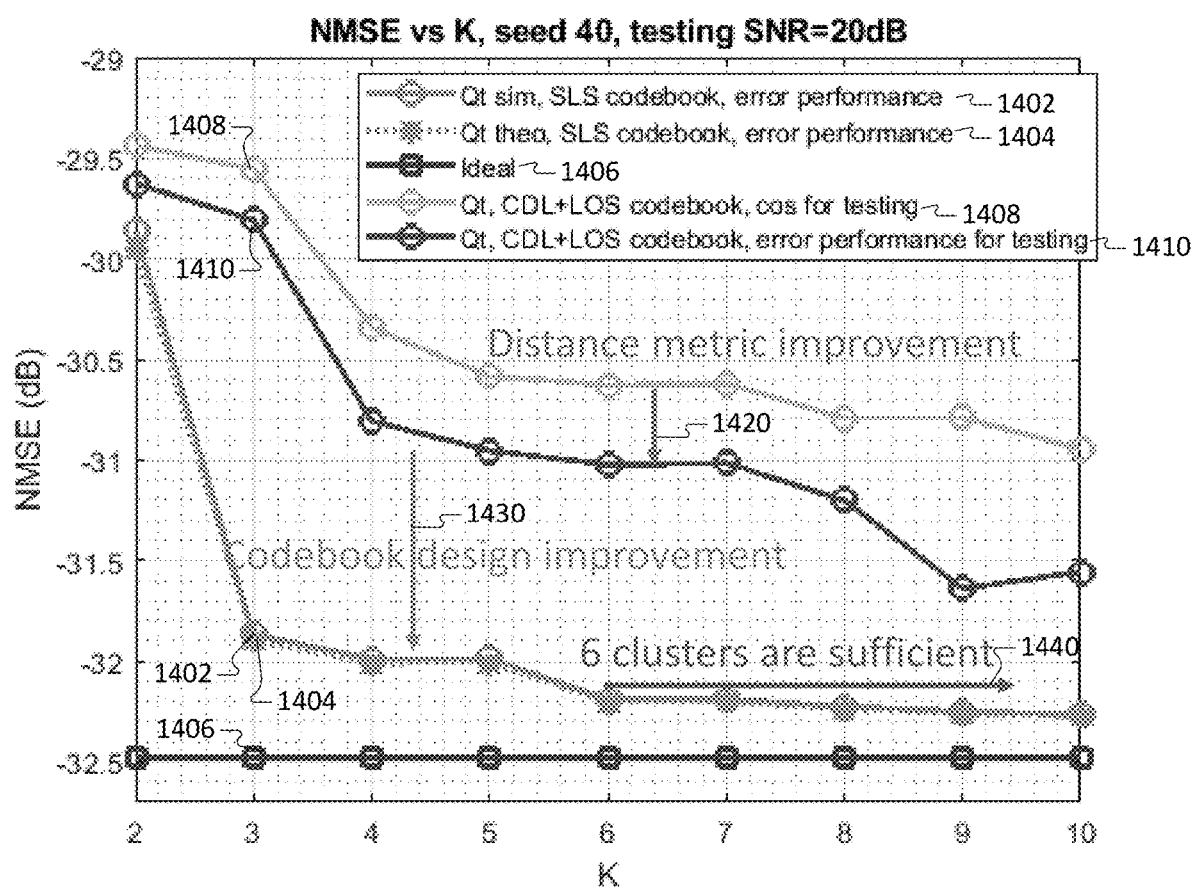
FIG. 14 illustrates a graph of NMSE versus size of codebook of seed 40 under 20 dB testing SNR, according to this disclosure.
Figure 16:
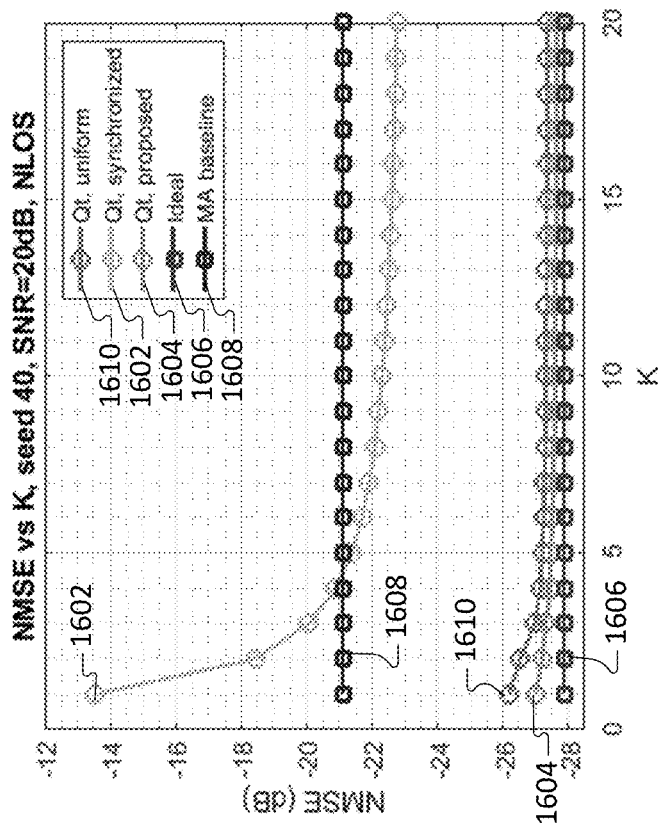
FIG. 16 illustrates a graph of NMSE versus size of codebook for NLOS channels only of seed 40 under 20 dB testing SNR, according to this disclosure.
Figure 15:
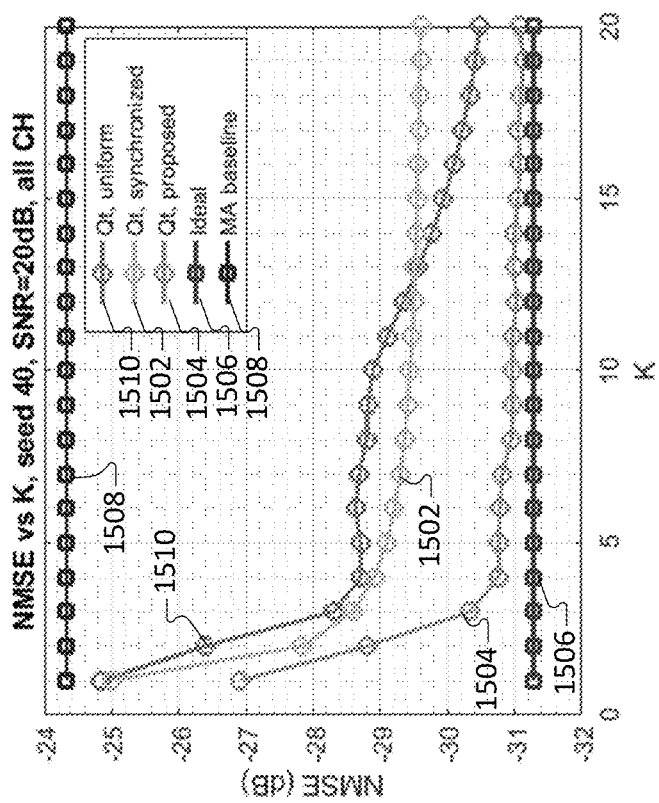
FIG. 15 illustrates a graph of NMSE versus size of codebook for all channels of seed 40 under 20 dB testing SNR, according to this disclosure.

Provided for comparison purposes, FIGS. 14, 15, and 16 illustrate the testing performance of three other codebooks. The embodiments of the graphs shown in FIGS. 14, 15, and 16 are for illustration only, and other embodiments could be used without departing from the scope of this disclosure.

FIG. 14 illustrates a graph of NMSE versus size of codebook of seed 40 under 20 dB testing SNR, according to this disclosure. The distance metric improvement 1420 (shown as an arrow) shows that a same codebook used with a different distance metric causes a channel estimation performance reduction of errors (i.e., more closely emulate to the ideal curve 1406) from the "Qt, CDL+LOS codebook, cos for testing" curve 1408 to the "Qt, CDL+LOS codebook, error performance for testing" curve 1410.

The codebook design improvement 1430 (shown as an arrow) shows that a same testing distance metric used with different codebook designs causes a channel estimation performance reduction of errors from the curve 1410 to the "Qt sim, SLS codebook, error performance" curve 1402. The simulation represented by the curve 1402 is substantially equivalent to the theoretical curve 1404.

The third improvement 1440 (shown as a horizontal arrow) shows that channel estimation performance reduction of errors is a marginal improvement from when the number of clusters (i.e., number of codewords) is K=6 to when the number of clusters increases to 10, but is a substantial improvement as the number of clusters increases from 2 to 6. In certain embodiments, a sufficient number (e.g., threshold number of clusters) of clusters in the ACF codebook 710 is K=6.

FIG. 15 illustrates a graph of NMSE versus size of codebook for all channels of seed 40 under 20 dB testing SNR, according to this disclosure. FIG. 16 illustrates a graph of NMSE versus size of codebook for NLOS channels only of seed 40 under 20 dB testing SNR, according to this disclosure. The legends in FIGS. 15 and 16 respectively describe a "Qt, synchronized" curve 1502 and 1602, a "Qt, proposed" curve 1504 and 1604, an ideal curve 1506 and 1606, a moving average baseline ("MA baseline") curve 1508 and 1608, and a "Qt, uniform" curve 1510 and 1610. The results in both FIGS. 15 and 16 show that the data-based codebook design, which is in accordance with embodiment of this disclosure, outperforms the design-based codebooks, outperforms a conventional moving average (MA) method, and is very close to the ideal performance (i.e., ideal curve 1406, 1506, or 1606) with sufficient size of codebook.

To emphasize that the data-based codebook design of this disclosure outperforms design-based codebooks, additional details about a design-based codebooks are described next. Based on a current understanding of the shape of weights in the delay domain, two design-based codebooks are built, including one that is of rectangular shape and the other that has a shape of exponential decay. For rectangular shaped filters, the maximum delay selected is uniformly distributed in [0, 5000] ns. For exponential decay shaped filters, the delay spread selected is uniformly distributed in [30, 1000] ns.

To emphasize that the data-based codebook design of this disclosure outperforms the moving average method, additional details about the moving average method are described next. Specifically, the moving average method uses estimated SNR as the benchmark.

Figure 18:
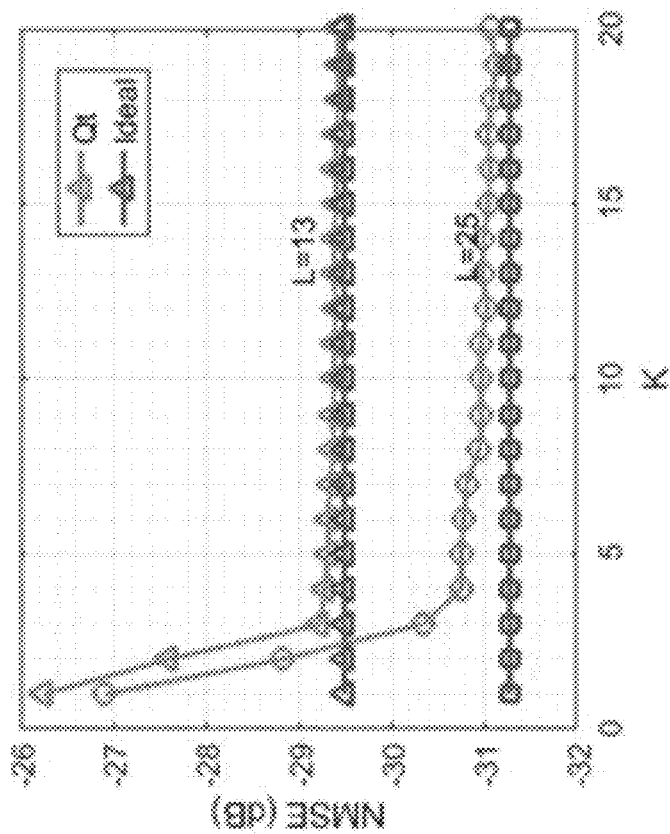
FIG. 18 illustrates a graph of NMSE versus size of codebook under different length of weights, according to this disclosure.
Figure 17:
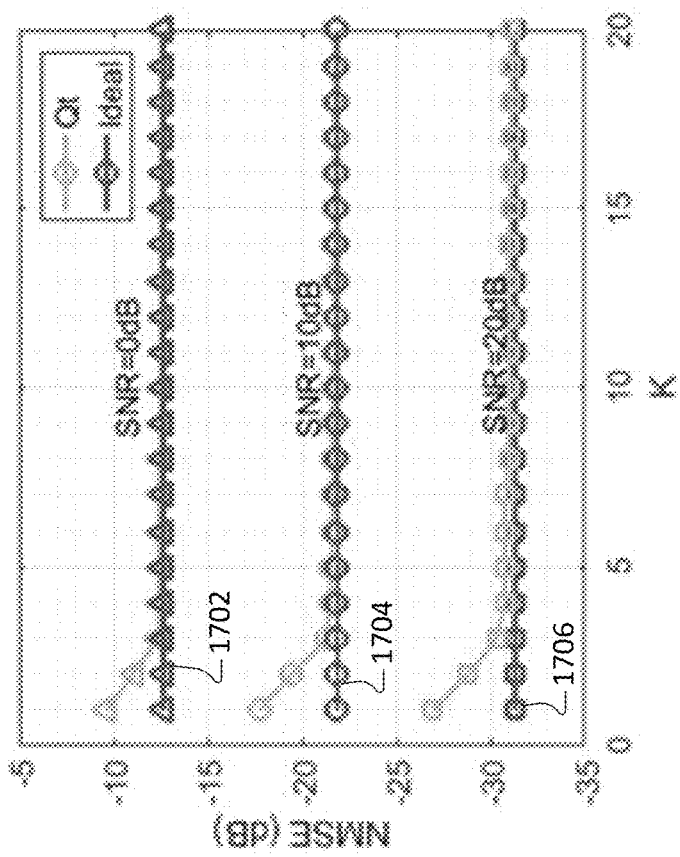
FIG. 17 illustrates a graph of NMSE versus the size of codebook under different SNRs, according to this disclosure.

FIGS. 17 and 18 illustrate testing results for a case in which the codebook 710 is obtained under a 20 dB training SNR and length of weights being L=25, and the system 700 tests that codebook 710 under lower SNRs and shorter length. FIG. 17 shows the testing results for lower testing SNRs, and FIG. 18 shows the testing results for shorter length of weights (e.g., L=13). The testing results shown in FIGS. 17 and 18 are close to the ideal case with sufficient codebook size, which demonstrates that the methods according embodiments of this disclosure, including obtaining a codebook 710 under high SNR and long feature (e.g., long length of weights such as L=25), can be applicable to lower SNR and shorter feature cases, which provides a technical advantage of reducing the complexity in training the codebook 710 under different SNR levels.

Specifically, FIG. 17 illustrates a graph of NMSE versus the size of codebook under different SNRs, according to this disclosure. The embodiments of the graph shown in FIG. 17 is for illustration only, and other embodiments could be used without departing from the scope of this disclosure. The graph includes ideal curves 1702, 1704, 1706 corresponding to different SNRs equal to 0 dB, 10 dB, and 20 dB, respectively. The graph includes Qt curves 1712, 1714, 1716 corresponding to different SNRs equal to 0 dB, 10 dB, and 20 dB, respectively.

Specifically, FIG. 18 illustrates a graph of NMSE versus size of codebook under different length of weights, according to this disclosure. The embodiments of the graph shown in FIG. 18 is for illustration only, and other embodiments could be used without departing from the scope of this disclosure. The graph includes ideal curves 1802 and 1804 corresponding to different lengths of weights that are L=13 and L=25, respectively. The graph includes Qt curves 1812 and 1814 corresponding to different lengths of weights that are L=13 and L=25, respectively.

Figure 19:
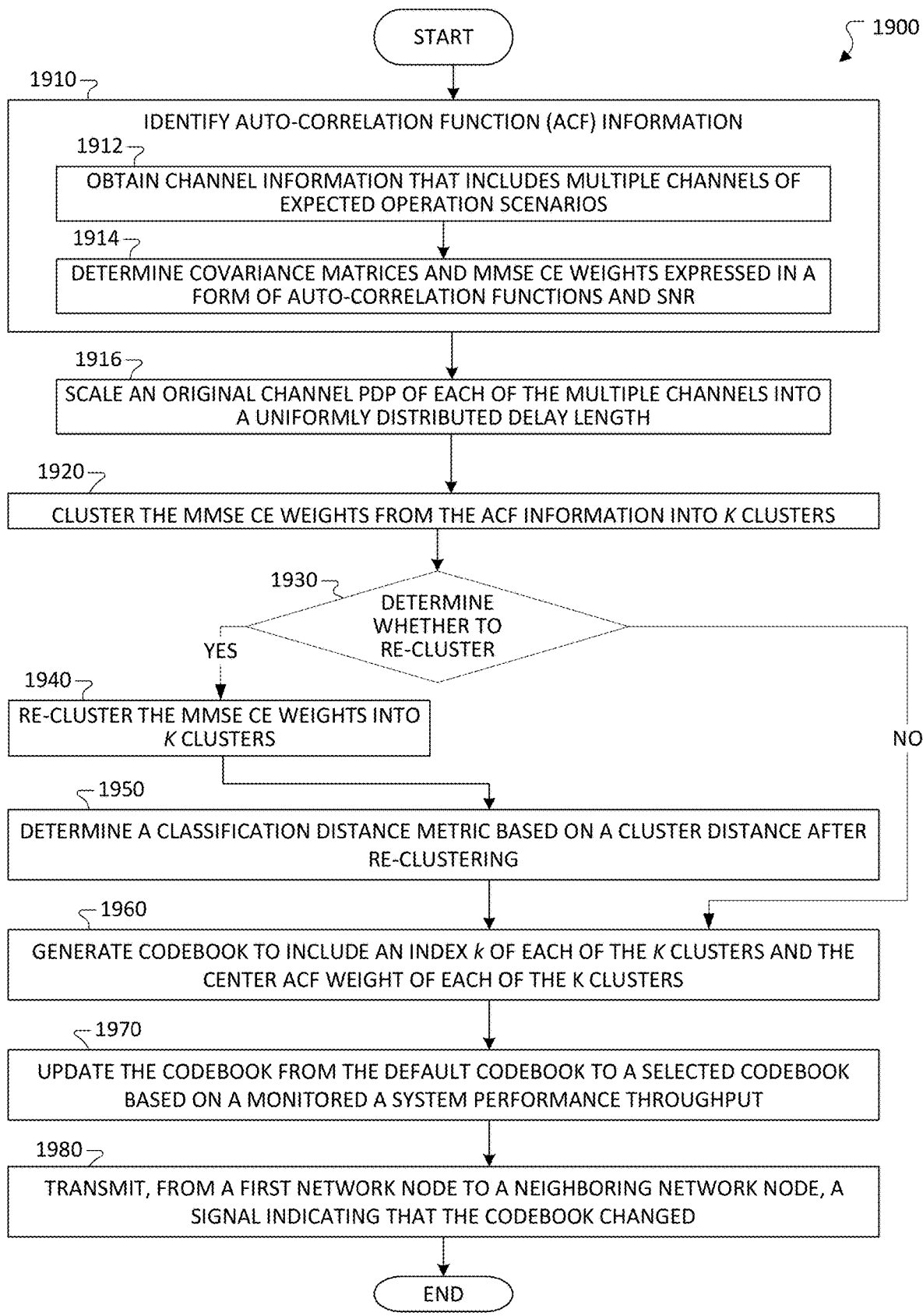
FIG. 19 illustrates a method 1900 for generating a codebook for AI-assisted channel estimation, according to this disclosure.

FIG. 19 illustrates a method 1900 for generating a codebook for AI-assisted channel estimation, according to this disclosure. The embodiment of the method 1900 shown in FIG. 19 is for illustration only, and other embodiments could be used without departing from the scope of this disclosure. The method 1900 is implemented by an electronic device, such as a wireless communication device that is configured to perform channel estimation based on the codebook, for example, the gNB 102 and/or UE 116 of FIG. 1. More particularly, the method 1900 could be performed by a processor 225, 340 of the electronic device executing the applications 232, 362 of FIGS. 2 and 3, respectively. For ease of explanation, the method 1900 is described as being performed by the processor 225 of the gNB 102 (also referred to as a first network node).

In block 1910, the processor 225 identifies auto-correlation function (ACF) information. As part of identifying the ACF information, in block 1912, the processor 225 obtains channel information that includes multiple channels of expected operation scenarios. Block 1914 is also as part of identifying the ACF information. In block 1914, based on the channel information for each of the channels, the processor 225 determines covariance matrices, and MMSE CE weights (w) expressed in a form of ACFs and an SNR.

In block 1920, the processor 225 clusters the MMSE CE weights from the ACF information into K clusters. A center ACF weight of each of the K clusters represents a codeword for computing the channel estimation weights. The procedure performed at block 1920 is the same as or similar to the procedures of blocks 840-850 of FIG. 8. In certain embodiments, clustering the MMSE CE weights from the ACF information into K clusters comprises utilizing a K-medoids clustering algorithm, wherein a center ACF weight is a center of one cluster from among the K clusters. In other embodiments, clustering the MMSE CE weights from the ACF information into K clusters comprises utilizing a K-mean clustering algorithm, wherein computing a center weight ($w_c$) comprises applying an unsymmetrical distance as expressed in Equations 19-20.

In certain embodiments, the method 800 includes block 1916. In block 1916, the processor 225 scales an original channel power delay profile (PDP) of each of the multiple channels into a uniformly distributed delay length based on a target delay spread. Then, clustering (at block 1920) the MMSE CE weights from the ACF information into K clusters is based on the scaled channel PDP in order to classify a shape of the channel PDP.

The procedure performed at block 1930 is the same as or similar to the procedure of block 860 of FIG. 8. In block 1930, the processor 225 determines whether to perform re-clustering. In certain embodiments, the processor 225 determines to re-cluster if the number of iterations of re-clustering has not reached a lower limit (e.g., minimum iteration). For example, if re-clustering has not been performed, then the processor 225 determines to re-cluster. In certain embodiments of block 1930, the processor 225 determines whether cluster distances before and after the clustering differ from each other by a non-negligible value. That is, the processor 225 determines whether to change the cluster centers by re-clustering.

In block 1940, the processor 225 performs re-clustering, in response to an affirmative determination (YES) at block 1930. More particularly, in response to a determination that cluster distances before and after the clustering differ from each other by a non-negligible value, iteratively re-clustering is performed, thereby updating the center ACF weights the cluster distances. The procedure performed at block 1940 is the same as or similar to the procedure of block 1920.

In block 1950, the processor 225 determines a classification distance metric based on a cluster distance after a re-clustering. In certain embodiments, a mismatched weight error performance (NMSE($\Delta w_a$)) is determined as the classification distance metric ($J(\Delta w_a)$).

In block 1960, the processor 225 generates the codebook 710 to include an index k of each of the K clusters and the center ACF weight of each of the K clusters. For example, the method 1900 can include forming the codebook 710 as a default codebook. The default codebook is designed according to a default deployment environment from among a set of different environments including: an urban micro (UMi) environment, an urban macro (UMa) environment, an urban canyon environment, or a rural environment.

In certain embodiments of block 1920, the clustering of the MMSE CE weights from the ACF information into K clusters occurs in a case wherein: the multiple channels of expected operation scenarios include high SNRs above a threshold SNR; and the codeword has a long codeword length that is greater than or equal to a threshold codeword length. After the codebook 710 is generated (at block 1960), the method 1900 can further include utilizing the codebook 710, which was clustered based on high SNRs and long codeword length, for estimating a channel having a lower SNR than the threshold SNR and a shorter codeword length than the threshold codeword length.

After codebook 710 is generated, the method 1900 can include sending (e.g., transmitting or deploying) the codebook formed to a wireless communication device (e.g., gNB 102 or UE 116) configured to perform channel estimation based on the codebook 710. A system performance throughput of the (e.g., gNB 102 or UE 116) is monitored during normal operations that utilize the default codebook 710 in online scenarios. If the monitored system performance throughout is low or is exhibiting characteristics of a different environment than the default deployment environment, then updating (at block 1970) of the codebook 710 from the default codebook to a selected codebook is performed based on a monitored a system performance throughput. The selected codebook is selected from among the set of different environments other than the default deployment environment. That is additional codebooks can be generated (e.g., based on the different environments) according to the embodiments of this disclosure, and can be available online to be probed by a wireless communication device (e.g., gNB 102 or UE 116).

After the codebooks are designed for applying in the wireless network 100, the disclosure provides a few variations of the method 1900. For example, the codebook can be designed according to different environments, e.g., UMi, UMa, urban canyon, rural, etc. When the codebook is applied to the gNB (or UE), a default codebook can be first assigned, and then the gNB (UE) can online probe other codebooks, and update to a better one of the codebooks if needed (e.g., reinforcement learning can be used to select from among the additional codebooks available for selection). When probing or deploying other codebooks, the throughput can be used as a metric for selection. When updating to another codebook, the gNB (UE) can update the entire codebook, or update a part of the codebook.

As another variation of the method 1900, after the gNB (UE) selects a codebook for channel estimation, the gNB continues monitoring the system performance throughput of each of the channels. If the channel estimation often performs badly, then the gNB collects identification of the channels having the badly performed channel estimation. Those channels identified as having bad system performance throughput can be further processed to form new codewords to add to the existing codebook. More particularly, the method 1900 further includes monitoring a system performance throughput of each of the channels. The method 1900 includes identifying, from among each of the monitored channels, a poor channel that exhibits system performance throughput less than a threshold throughput. Also, the method 1900 includes expanding the codebook to include new codewords corresponding to the identified poor channel by adding the identified poor channel to the channel information (e.g., 704 of FIG. 7).

As another variation of the method 1900 after the codebook 710 is generated, during the online operation, if a gNB (UE) has updated and/or expanded its codebook 710, then the information can be passed on to other surrounding gNB 101 or 103 (UE 111-115). The other gNB (UE) can use the information passed as prior knowledge to probe/update its own codebooks. More particularly, the method 1900 includes transmitting (at block 1980), from a first network node (e.g., gNB 102) to a neighboring network node (e.g., gNB 101 or 103), at least one of: a signal indicating that the codebook has been expanded to include new codewords; or a signal indicating that the codebook has been updated from a default codebook to a selected codebook.

Although FIG. 19 illustrates an example method 1900 for generating a codebook for AI-assisted channel estimation, various changes may be made to FIG. 19. For example, while shown as a series of steps, various steps in FIG. 19 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for generating a codebook, the method performed by at least one processor, the method comprising:
   identifying auto-correlation function (ACF) information by:
      obtaining channel information that includes multiple channels of expected operation scenarios; and
      based on the channel information for each of the channels, determining minimum mean-square error (MMSE) channel estimation (CE) weights expressed in a form of auto-correlation functions (ACFs) and a signal-to-noise ratio (SNR), and covariance matrices;
   clustering the MMSE CE weights from the ACF information into K clusters, wherein a center ACF weight of each of the K clusters represents a codeword for computing channel estimation weights;
   determining a classification distance metric based on a cluster distance after a re-clustering;
   in response to a determination that cluster distances before and after the clustering differ from each other by a non-negligible value, iteratively re-clustering the ACF information thereby updating the center ACF weights and the cluster distances; and
   generating the codebook to include an index k of each of the K clusters and the center ACF weight of each of the K clusters.

2. The method of claim 1, wherein:
   clustering the MMSE CE weights from the ACF information into K clusters comprises utilizing a K-medoids clustering algorithm; and
   a center ACF weight is a center of one cluster from among the K clusters.

3. The method of claim 1, wherein:
   clustering the MMSE CE weights from the ACF information into K clusters comprises utilizing a K-mean clustering algorithm; and
   computing a center weight ($w_c$) comprises applying an unsymmetrical distance expressed as:

$$w_c = \min_{w_c}\left(\sum (w_a - w_c)^H R_{hha}(w_a - w_c)\right)$$

$$w_c = \left(\sum R_{hha} w_a\right) / \sum R_{hha},$$

where $w_a$ represents ideal MMSE weights for sample a, $w_c$ represents the center weight, and $R_{hha}$ represents a covariance matrix of sample channel a,
   wherein each of the $w_a$ and $w_c$ weights is associated with a ACF weight.

4. The method of claim 1, further comprising:
   scaling an original channel power delay profile (PDP) of each of the channels into a uniformly distributed delay length based on a target delay spread; and
   clustering the MMSE CE weights from the ACF information into K clusters, based on the scaled channel PDP in order to classify a shape of the channel PDP.

5. The method of claim 1, further comprising determining a mismatched weight error performance (NMSE($\Delta w_a$)) as the classification distance metric (J($\Delta w_a$)).

6. The method of claim 1, further comprising:
   forming the codebook as a default codebook; and
   updating the codebook from the default codebook to a selected codebook based on a monitored a system performance throughput,
   wherein:
      the default codebook is designed according to a default deployment environment from among a set of different environments including:
         an urban micro (UMi) environment,
         an urban macro (UMa) environment,
         an urban canyon environment, or
         a rural environment; and
      the selected codebook is selected from among the set of different environments other than the default deployment environment.

7. The method of claim 1, further comprising:
   the clustering of the MMSE CE weights from the ACF information into K clusters, wherein:
      the multiple channels of expected operation scenarios include high SNRs above a threshold SNR; and
      the codeword has a long codeword length that is greater than or equal to a threshold codeword length; and
   utilizing the codebook, which was clustered based on the high SNRs and long codeword length, for estimating a channel having a lower SNR than the threshold SNR and a shorter codeword length than the threshold codeword length.

8. The method of claim 1, further comprising:
   monitoring a system performance throughput of each of the channels;
   identifying, from among each of the monitored channels, a poor channel that exhibits system performance throughput less than a threshold throughput; and
   expanding the codebook to include new codewords based on the identified poor channel by adding the identified poor channel to the channel information.

9. The method of claim 1, further comprising transmitting, from a first network node to a neighboring network node, at least one of:
   a signal indicating that the codebook has been expanded to include new codewords; or
   a signal indicating that the codebook has been updated from a default codebook to a selected codebook.

10. The method of claim 1, further comprising transmitting the codebook formed to a wireless communication device configured to perform channel estimation based on the codebook, wherein wireless communication device is a first network node or a user equipment.

11. An electronic device for generating a codebook, the electronic device comprising:
    a transceiver; and
    a processor coupled to the transceiver and configured to:
       identify auto-correlation function (ACF) information, wherein to identify the AFC information, the processor is further configured to:
          obtain channel information that includes multiple channels of expected operation scenarios; and
          based on the channel information for each of the channels, determine minimum mean-square error (MMSE) channel estimation (CE) weights expressed in a form of auto-correlation functions (ACFs) and a signal-to-noise ratio (SNR), and covariance matrices;

cluster the MMSE CE weights from the ACF information into K clusters, wherein a center ACF weight of each of the K clusters represents a codeword for computing channel estimation weights;

determine a classification distance metric based on a cluster distance after a re-clustering;

in response to a determination that cluster distances before and after the clustering differ from each other by a non-negligible value, iteratively re-cluster the ACF information thereby updating the center ACF weights and the cluster distances; and generate the codebook to include an index k of each of the K clusters and the center ACF weight of each of the K clusters.

12. The electronic device of claim 11, wherein:

to cluster the MMSE CE weights from the ACF information into K clusters, the processor is further configured to utilize a K-medoids clustering algorithm; and a center ACF weight is a center of one cluster from among the K clusters.

13. The electronic device of claim 11, wherein:

to cluster the MMSE CE weights from the ACF information into K clusters, the processor is further configured to utilize a K-mean clustering algorithm; and to compute a center weight ($w_c$), the processor is further configured to apply an unsymmetrical distance expressed as:

$$w_c = \min_{w_c} \left( \sum (w_a - w_c)^H R_{hha}(w_a - w_c) \right)$$

$$w_c = \left( \sum R_{hha} w_a \right) / \sum R_{hha},$$

where $w_a$ represents ideal MMSE weights for sample a, $w_c$ represents the center weight, and $R_{hha}$ represents a covariance matrix of sample channel a, wherein each of the $w_a$ and $w_c$ weights is associated with a ACF weight.

14. The electronic device of claim 11, wherein the processor is further configured to:

scale an original channel power delay profile (PDP) of each of the channels into a uniformly distributed delay length based on a target delay spread; and cluster the MMSE CE weights from the ACF information into K clusters, based on the scaled channel PDP in order to classify a shape of the channel PDP.

15. The electronic device of claim 11, wherein the processor is further configured to determine a mismatched weight error performance (NMSE($\Delta w_a$)) as the classification distance metric (J($\Delta w_a$)).

16. The electronic device of claim 11, wherein the processor is further configured to:

form the codebook as a default codebook; and update the codebook from the default codebook to a selected codebook based on a monitored a system performance throughput, wherein:

the default codebook is designed according to a default deployment environment from among a set of different environments including:

an urban micro (UMi) environment, an urban macro (UMa) environment, an urban canyon environment, or a rural environment; and the selected codebook is selected from among the set of different environments other than the default deployment environment.

17. The electronic device of claim 11, wherein the processor is further configured to:

cluster of the MMSE CE weights from the ACF information into K clusters, wherein:

the multiple channels of expected operation scenarios include high SNRs above a threshold SNR; and the codeword has a long codeword length that is greater than or equal to a threshold codeword length; and estimate a channel having a lower SNR than the threshold SNR and a shorter codeword length than the threshold codeword length based on utilizing the codebook, which was clustered based on the high SNRs and long codeword length.

18. The electronic device of claim 11, wherein the processor is further configured to:

monitor a system performance throughput of each of the channels;

identify, from among each of the monitored channels, a poor channel that exhibits system performance throughput less than a threshold throughput; and expand the codebook to include new codewords based on the identified poor channel by adding the identified poor channel to the channel information.

19. The electronic device of claim 11, wherein the processor is further configured to transmit, from a first network node to a neighboring network node, at least one of:

a signal indicating that the codebook has been expanded to include new codewords; or a signal indicating that the codebook has been updated from a default codebook to a selected codebook.

20. The electronic device of claim 11, wherein the processor is further configured to transmit the codebook formed to a wireless communication device configured to perform channel estimation based on the codebook, wherein wireless communication device is a first network node or a user equipment.

* * * * *